United States Patent
Ben-Yehuda et al.

(10) Patent No.: US 8,521,868 B2
(45) Date of Patent: Aug. 27, 2013

(54) PLATFORM-LEVEL INDICATORS OF APPLICATION PERFORMANCE

(75) Inventors: Shmuel Ben-Yehuda, Haifa (IL); David Breitgand, Modiin (IL); Michael E. Factor, Haifa (IL); Elliot K. Kolodner, Haifa (IL); Dan Pelleg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 12/251,470

(22) Filed: Oct. 15, 2008

(65) Prior Publication Data

US 2010/0094990 A1 Apr. 15, 2010

(51) Int. Cl.
*G06F 15/173* (2006.01)

(52) U.S. Cl.
USPC .......................................... 709/224; 709/223

(58) Field of Classification Search
USPC .................................. 709/224–226
See application file for complete search history.

(56) References Cited

U.S. PATENT DOCUMENTS

| | | | | |
|---|---|---|---|---|
| 5,781,729 | A * | 7/1998 | Baker et al. | 709/230 |
| 5,802,320 | A * | 9/1998 | Baehr et al. | 709/249 |
| 7,050,931 | B2 * | 5/2006 | Conrad | 702/177 |
| 7,257,081 | B2 * | 8/2007 | Rajan et al. | 370/231 |
| 7,804,787 | B2 * | 9/2010 | Brandyburg et al. | 370/252 |
| 7,877,507 | B2 * | 1/2011 | Schneider | 709/238 |
| 2004/0136379 | A1 * | 7/2004 | Liao et al. | 370/395.21 |
| 2006/0293777 | A1 * | 12/2006 | Breitgand et al. | 700/108 |
| 2007/0011317 | A1 * | 1/2007 | Brandyburg et al. | 709/224 |
| 2007/0136495 | A1 * | 6/2007 | Boucher et al. | 709/250 |
| 2008/0155537 | A1 * | 6/2008 | Dinda et al. | 718/1 |
| 2009/0006607 | A1 * | 1/2009 | Bu et al. | 709/224 |
| 2009/0222578 | A1 * | 9/2009 | Schneider | 709/238 |

* cited by examiner

*Primary Examiner* — Peling Shaw

(57) ABSTRACT

A method for monitoring performance includes monitoring packet traffic on at least one socket that is associated with an application running on a computer and is communicated over a data network. First and second instances of a performance indicator of the packet traffic are measured respectively during first and second monitoring intervals. An alert is issued upon making a determination that a change between the first instance and the second instance exceeds a predetermined threshold.

17 Claims, 3 Drawing Sheets

PLATFORM-LEVEL INDICATORS OF APPLICATION PERFORMANCE

BACKGROUND OF THE INVENTION

The present invention relates generally to computer system management, and specifically to monitoring computing machines without a priori knowledge of the applications running on the machines.

Virtual machine computing simplifies the use of computing resources by elevating the level of abstraction, which benefits resource providers. Server virtualization is typically used to make more efficient use of server resources, to improve server availability, and to centralize server administration. Server virtualization masks server resources, such as the identity of individual physical servers and processors, from server users. Furthermore, with the advent of freeze-dried software stacks, virtualization also has the potential to mask the operating system.

A single physical server is usually divided into multiple isolated virtual environments.

The use of virtual computers (generally referred to as "virtual machines") to enhance computing power has been known for several decades. For example, a classic system, VM, produced by the IBM Corporation, enabled multiple users to concurrently use a single computer by running multiple copies of the operating system. Virtual computers have been realized on many different types of computer hardware platforms, including both single-processor and multi-processor units.

Monitoring the status of applications running on a distributed network typically includes passive network monitoring or a combination of application-level and passive network monitoring. Data flows are identified and data is collected on a per-flow or per-application basis, enabling calculation of performance metrics. Collecting and publishing per-flow network data is typically performed using standards such as internet protocol flow information export (IPFIX) and Netflow™.

SUMMARY

An embodiment of the present invention provides a method for monitoring performance in which packet traffic is monitored on at least one socket that is associated with an application running on a computer and is communicated over a data network. First and second instances of a performance indicator of the packet traffic are respectively measured during first and second monitoring intervals. Upon making a determination that a change between the first instance and the second instance exceeds a predetermined threshold, an alert is issued.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION

Figure 1:
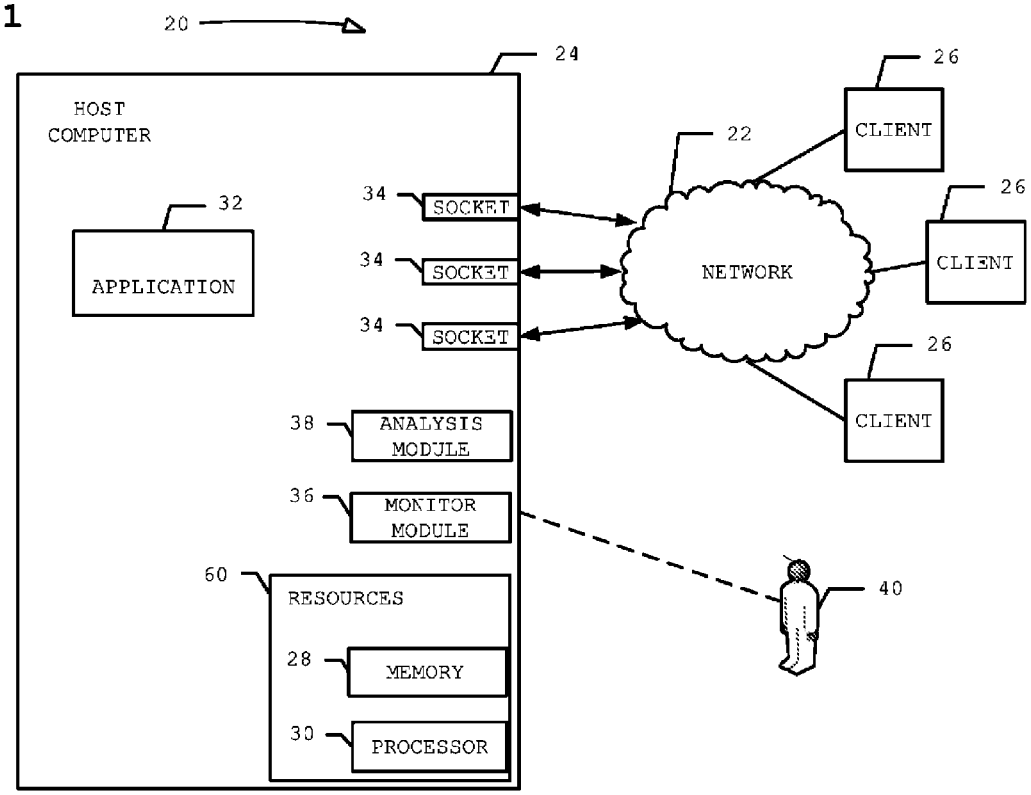
FIG. 1 is a block diagram that schematically illustrates a system that is monitored by an application performance monitoring system, in accordance with an embodiment of the present invention.

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Overview

Measuring indicators of application performance typically requires application-level knowledge. For example, an application response measurement (ARM) standard provides application management capabilities, including measurement of application availability, performance, usage, and end-to-end transaction response time. In order to use the ARM standard to monitor an application or to monitor middleware used to execute the application, an application or middleware programmer typically needs to integrate the application with an ARM standard software development kit (SDK). Integration with the ARM standard SDK or other application monitoring products typically requires effort on the part of the application or middleware programmer. In addition, the programmers usually need to have an understanding of the application to be monitored.

In an embodiment of the present invention, a human system manager or an automated management software program may measure indicators of server application performance without requiring knowledge of the server application itself. Rather, it may be sufficient to know that an application communicates with clients across sockets via a data network such as the Internet, and is the only application sending and receiving data packets via the sockets in question. In the context of this patent application and claims, the term "data network" refers to any network across which data may be sent from one computing device to another, including, without limitation, Internet Protocol (IP), Ethernet, and Fibre Channel networks. The term "sockets" denotes any end-point of a process communication flow, not limited to any particular protocol. The embodiments described in this patent application focus on environments in which a computer system runs a single application, which is an increasingly common situation in systems that use virtualization and freeze dried stacks. The use in such systems of virtual appliances or pre-packaged software stacks that include the application, middleware (if necessary) and operating systems is emerging. In this paradigm, one virtual appliance runs on each virtual machine. In this context the application is that virtual appliance.

The human system manager or automated software program may use a monitor module to monitor the sockets on a server running the application of interest, and to gather statistics about packet traffic, including data packets received and sent on each socket. For example, the monitor module may take measurements to capture data such as a total number of packets received and sent via the data network. In another example, the control data in the packets is analyzed, and the number of open connections or number of queries per unit time is tracked. An analysis module analyzes performance indicators in order to learn about application performance. In one type of analysis, the analysis module looks at frequency distributions of the measurements taken by the monitor module. The analysis module identifies inbound and outbound packets that are received and transmitted by the application. The analysis module may also determine the relationship between data packets received and sent by the application as described hereinbelow. It may also correlate such performance indicators with other types of measurements. For example, the metric of interest may be defined to be the mean ratio of service time to CPU utilization, or the mean ratio of number of open network connections to number of transactions processed.

Server applications typically receive requests to perform tasks and then return the results over the data network. Examples of server applications include mail servers, web servers, and database servers. One performance indicator, the length of the time interval between a request and a response to the request, can provide an estimate of the performance of the application. In addition to considering mean intervals, the performance indicator may comprise other statistics, such as minimum, maximum, variance, or a given percentile level. In addition, composite measures may be defined, such as mean ratio of service time to CPU utilization. Other performance indicators will occur to those who are skilled in the art. In the current example, the difference between the number of packets received and the number of packets sent provides an estimate of an information packet mean queue length, as described hereinbelow. The application may support multiple transaction types, which may cause the analysis module to detect multimodal distribution on the sockets when analyzing performance.

Changes in the distribution of the time interval and changes in the estimated mean queue length may indicate changes in the performance of the application. This inference is particularly useful when monitoring virtual server applications. Typically, each virtual machine runs a single server application. However, any type of virtual or real machine that is identified to have the application running, and to have dedicated internet protocol sockets used for communication of packet traffic between the application and its clients may utilize the monitoring process described hereinbelow.

When the distribution changes or the estimated mean queue length grows, reflecting a possible change in application performance, the analysis module may alert the human system manager or automated management software program. The human system manager may check to see if a resource needed by the monitored server application, such as available memory, storage, or processing is in short supply. The human system manager may then provide additional resources in order to restore server application performance to a normal operating level.

System Architecture

Reference is now made to FIG. 1, which is a block diagram showing a system that is monitored by an application performance monitoring system 20, in accordance with an embodiment of the present invention. Application performance monitoring system 20 uses a data network 22 to provide communication links between assorted devices and computers within system 20. Data network 22 may comprise an internet protocol network, and may include connections, such as wire, wireless communication links, or fiber optic cables.

A host computer 24 serves a number of clients 26 shown as being connected to data network 22. Host computer 24 comprises resources 60 that include a memory 28 and a processor 30. Memory 28 may be used by host computer 24 to store software programs and data objects. Clients 26 may be implemented by such devices as personal computers, personal digital assistants (PDA's), or any suitable computing device, either fixed or mobile, so long as the computing device has facilities for accessing data network 22. A client in this context could also be an application running on another host. Clients 26 may use the same or different operating systems in many combinations, and are provided with suitable memory for executing program instructions that support the functions and activities detailed below.

Host computer 24 may provide data, such as database query responses, web pages, and email to clients 26. A application 32 executes on host computer 24. Host computer 24 comprises network sockets 34, each of which is an end-point of a duplex communication link that is mapped to a computer process such as application 32. Communication between clients 26 and host computer 24 on a network, such as data network 22, takes place via data packets sent and received on network sockets 34. Clients 26 submit requests in the form of request data packets sent to host computer 24 for processing by application 32 across data network 22, which are received on network sockets 34. Application 32 replies to the requests by sending responses in the form of corresponding data packets issued from network sockets 34, routed through data network 22 to clients 26.

A monitor module 36 monitors packet traffic passing through network sockets 34, periodically gathering statistics about data packets received and sent by application 32 running on a host computer 24 to clients 26 as detailed hereinbelow. For example, monitor module 36 typically monitors data packet receipt times and exit times of corresponding data packets. As will be appreciated by one skilled in the art, monitor module 36 may be embodied as a process, service, or application.

An analysis module 38 analyzes the statistics gathered by monitor module 36, computing, e.g., a probability distribution of request latencies. Analysis module 38 is typically under local or remote control of a system administrator 40. As will be appreciated by one skilled in the art, analysis module 38 may be embodied as a process, service, or application and in some cases may not be collocated with application 32.

Analysis module 38 calculates a performance indicator to determine the performance quality of application 32. In the present embodiment, analysis module 38 calculates one performance indicator, latency, by summing the time a request data packet is enqueued for service by application 32, referred to herein as "queue time," together with service time as detailed hereinbelow. If the probability distribution for latency changes, such that queue time grows significantly while request processing time remains constant, analysis module 38 determines that there may be a system resource issue on host computer 24. An alert may then be sent by analysis module 38 to a human system manager or to automated management software. Analysis can then be performed by the human system manager or the management software to determine which resource needs to be provided or to otherwise optimize the configuration of system 20.

System Administration

System administrator 40 typically configures monitoring frequency and duration, in addition to a delay tolerance for distribution changes. The nature and purpose of the delay tolerance are disclosed in further detail below. System administrator 40 configures monitor module 36 to monitor application 32 for a monitoring interval, e.g. one minute. In another configuration, system administrator 40 sets a monitoring frequency, determining how often monitoring should be performed by monitor module 36. Monitoring by monitor module 36 does not need to be continuous. In some embodiments system administrator 40 configures monitor module 36 to monitor network sockets 34 discontinuously. Additionally or alternatively, monitor module 36 may be configured to monitor network sockets 34 once the load on host computer 24 reaches a predetermined threshold. For example, monitor module 36 may be configured to begin monitoring network sockets 34 once the volume of data packets passing through monitored network sockets 34 on host computer 24 reaches a predetermined packet traffic level.

System administrator 40 may vary the monitoring interval or sampling frequency in order to achieve a required precision. Configuration of a longer monitoring interval or lower sampling frequency typically lowers the overhead required by monitor module 36, while increasing the delay before an alert is raised after a performance drop occurs. Configuration of a shorter monitoring interval or higher sampling frequency typically increases the overhead, while decreasing the delay between the performance drop and the alert. Precision of the analysis is dependent on fine tuning of the monitoring interval parameter. In general, the parameter should be large enough to satisfy the balanced jobs assumption, i.e., the number of requests that enter the system roughly equals the number of request that exit the system (see "The Art of Computer Systems Performance Analysis: Techniques for Experimental Design, Measurement, Simulation, and Modeling," by Raj Jain (Wiley-Interscience, NY, April 1991, ISBN: 0471503361). The notion of "large enough" may differ from system to system, however, and therefore is a matter of fine tuning that may be performed either manually or automatically.

System administrator 40 configures analysis module 38, setting the delay tolerance. The delay tolerance accommodates a permissible deviation in mean latency as described below, and defines a range within which data packet wait time is allowed to vary above a predetermined threshold. In one configuration, system administrator 40 sets an analysis frequency, determining how often analysis module 38 should analyze statistics gathered by monitor module 36.

Configuration of the monitoring and analysis modules may also be done automatically.

Embodiment 1

Figure 2:
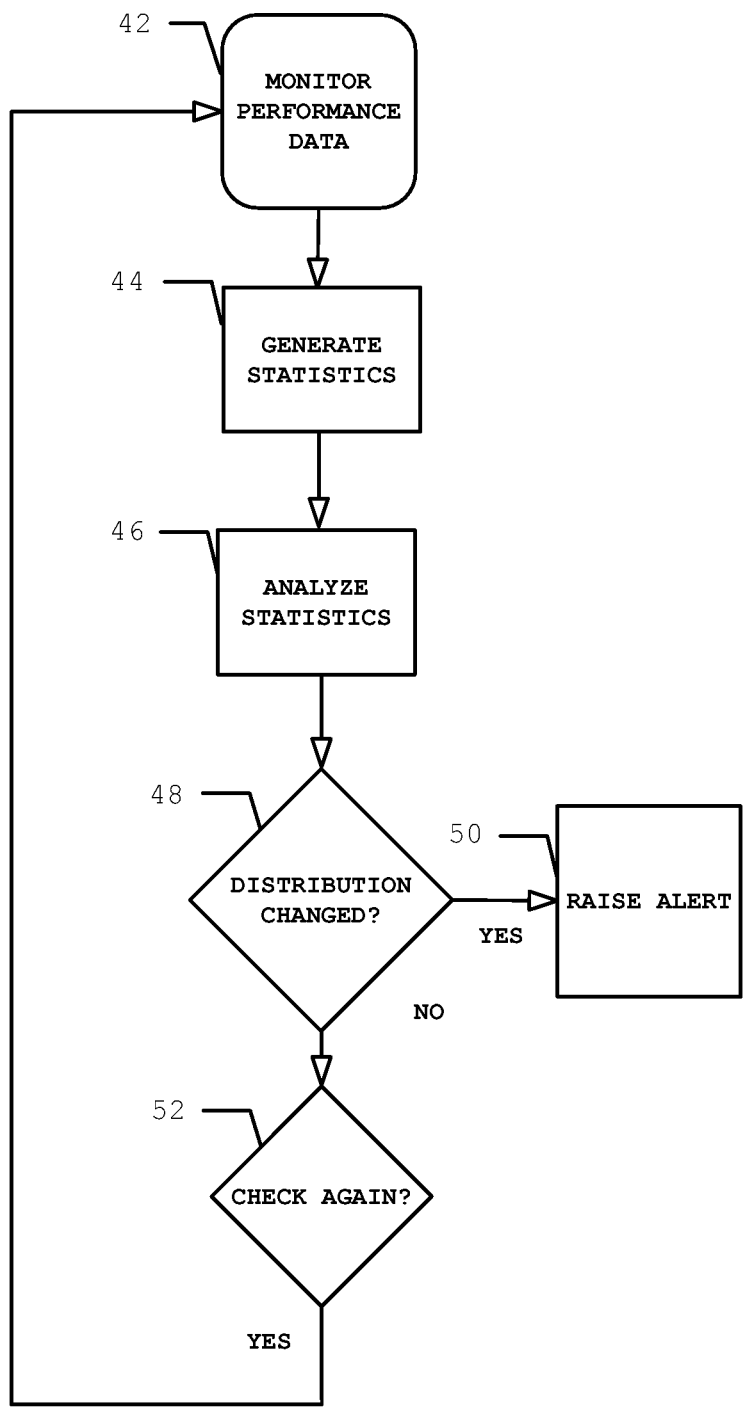
FIG. 2 is a flow chart of an application performance monitoring method, in accordance with an embodiment of the present invention.

Reference is now made to FIG. 2, which is a flow chart of an application performance monitoring method, in accordance with an embodiment of the present invention. For convenience and clarity, the method is described hereinbelow with reference to system 20, shown in FIG. 1, but the method may alternatively be carried out in other monitoring and analysis configurations. For example, the analysis module used in the method may be located on a different host from the application being monitored and the monitor module.

In a performance data monitoring step 42, monitor module 36 monitors network sockets 34, capturing headers of data packets received by host computer 24 from clients 26 and headers of data packets sent to clients 26 by host computer 24 via network sockets 34 during a monitoring interval. Monitor module 36 may also record data from the data packet headers, such as a socket identifier, a packet direction, either sent or received, and a timestamp. Some communication between application 32 and clients 26 may be in the form of multi-packet messages, also known as "packet trains", typically when application 32 responds to requests from clients 26. Monitor module 36 typically records data only from a first data packet in a packet train upon identifying the packet train.

In a statistics generating step 44, analysis module 38 generates statistics to describe the performance data monitored by monitor module 36, typically by calculating a mean queue length (such as the length of the request queue), a mean latency, a mean service time, and a mean queue time over the monitoring interval.

In a statistics analyzing step 46, analysis module 38 analyzes the statistics generated in statistics generating step 44. The mean queue length represents a difference between the number of data packets received from clients 26 by host computer 24 and the number of data packets sent to clients 26 by host computer 24 over a time interval $\delta < \Delta$, wherein $\Delta$ denotes the above-mentioned monitoring interval of monitor module 36. Setting $k = \Delta/\delta$ to be the number of the smaller time intervals of duration $\delta$ that fit into a single monitoring interval of duration $\Delta$ gives:

$$L = \frac{\sum_{i=1}^{k} p_r^i - \sum_{i=1}^{k} p_s^i}{k}. \tag{1}$$

Here L is mean queue length, $p_r^i$ is the number of packets received during time interval i of duration $\delta$, and $p_s^i$ is the number of packets sent to clients 26 via network sockets 34 by application 32 during time interval i of duration $\delta$.

Analysis module 38 uses the second form of Little's law as described, for example, in "The Art of Computer Systems Performance Analysis: Techniques for Experimental Design, Measurement, Simulation, and Modeling," by Raj Jain (Wiley-Interscience, NY, April 1991, ISBN:0471503361), to derive an approximation of the mean queue time, using the approximation of L calculated in the following equation:

$$W = \frac{L}{\lambda}, \tag{2}$$

where $\lambda$ is an average inter-arrival rate and W is the mean queue time. Average arrival rate $\lambda$ is a directly measured metric, enabling monitor module 36 to monitor the average arrival rate precisely. As noted hereinabove, monitor module 36 typically records data only from the first data packet in monitored packet trains. The average arrival rate is the time between receipt of the request data packet by host computer 24 on network sockets 34, and the exit time from network sockets 34 of the corresponding data packet sent to clients 26 by application 32, typically containing a response to the request. The approximation of the mean queue time derived in Equation 2 may have a measurement error introduced by systematic errors inherent in estimating the mean queue length. However, the measurement error should not affect the analysis performed by analysis module 38.

Analysis module 38 calculates mean latency using the following equation:

$$T = \frac{\sum t_s - \sum t_r}{p_s}, \tag{3}$$

where T is the mean latency; $t_s$ are times at which the data packet containing the responses are sent back to clients 26 via network sockets 34 by application 32; $t_r$ are times at which the data packet containing the requests is received by application 32 from clients 26 via network sockets 34; and $p_s$ is the number of packets received by the application from clients 26 via network sockets 34 during the monitoring interval $\Delta$. The summation is performed over all requests and responses logged during the monitoring interval $\Delta$ as discussed above.

Analysis module 38 calculates mean service time using the following equation:

$$S = T - W \tag{4},$$

where S is the mean service time.

In a distribution change decision step 48, analysis module 38 decides whether the frequency distributions have changed enough to warrant raising an alert. It is necessary to distinguish between a first case in which an increase in the mean latency T caused by transactions of increased complexity being processed by application 32 leading to an increase in mean service time S, and a second case in which the increase in the mean latency T is caused by data packets being enqueued for service for a longer period of time, leading to an increase in mean queue time W.

Increased transaction complexity is usually considered to be normal behavior for application 32. However, if mean queue time W has increased from one monitoring interval to the next, while mean service time S has remained the same, it indicates that there is a problem. For example, there may be an issue with host computer 24, such as a shortage of required resources for application 32.

Analysis module 38 may use the delay tolerance to determine whether a significant performance change has occurred. System administrator 40 may configure the delay tolerance as described hereinabove in the System Administration section. Alternatively or additionally, the delay tolerance may be automatically adjusted by analysis module 38 responsively to the changes in performance measurements. Analysis module 38 determines that a performance change has occurred when the mean queue time W increases from one monitoring interval to the next, while the mean service time S remains constant. Analysis module 38 compares the values of W and S in previous and current monitoring intervals. If W has increased to exceed the delay tolerance, while S has remained unchanged, analysis module 38 raises an alert in an alert raising step 50. The delay tolerance delineates the maximum increase by W from one monitoring interval to the next.

The alert reports that during the monitoring interval of monitor module 36, the transactions processed by application 32 executing on host computer 24 took significantly longer than expected. Analysis module 38 may communicate the alert to system administrator 40 or to automated management software. The human manager or automated management software may respond to the alert by taking corrective measures, such as providing additional resources to host computer 24 or to the computer in question such as a virtual machine in the embodiment described hereinbelow.

If W has increased by less than the delay tolerance, and no alert is raised, analysis module 38 waits until elapse of a time interval set by system administrator 40 in a performance data rechecking step 52.

Embodiment 2

Figure 3:
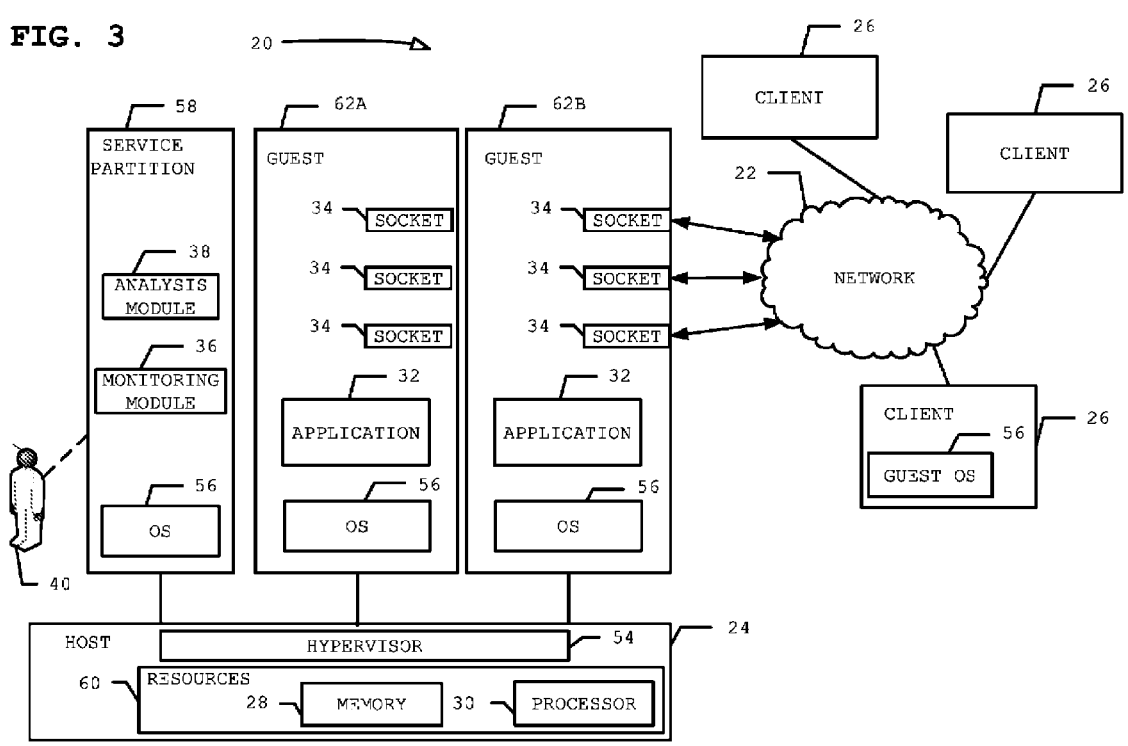
FIG. 3 is a block diagram that schematically illustrates an application performance monitoring system, in accordance with an alternate embodiment of the present invention.

Reference is now made to FIG. 3 which is a block diagram that schematically illustrates an application performance monitoring system, in accordance with an alternate embodiment of the present invention. The diagram is similar to the diagram of FIG. 1, except as described below.

In the embodiment shown in FIG. 3, system 20 supports clients 26 by utilizing a virtual platform that includes a virtual machine manager, implemented as a hypervisor 54, which is typically realized as a software program that resides in memory 28. An example of hypervisor 54 is Xen™, a free open-source program that allows multiple guest operating systems to be executed on the same computer hardware at the same time. Hypervisor 54 interacts with at least one guest operating system 56 of clients 26 or of host computer 24. Guest operating system 56 controls one or more virtual machines, which present themselves to guest operating system 56 as though they were conventional real machines. In the example shown in FIG. 3, there are three virtual machines running on host computer 24, which respectively perform the functions of a service partition 58 and virtual servers 62A, 62B (referred to generically hereinbelow as server 62). This specific configuration is shown solely by way of example, and the principles of this embodiment may similarly be implemented in different virtual machine configurations.

Server 62 may provide data to clients 26. Application 32 executes on server 62, supported by guest operating system 56, which can be any conventional operating system, e.g., Microsoft Windows®, Unix®, or Linux®. Server 62 comprises network sockets 34, and communication between clients 26 and server 62 on data network 22 takes place on network sockets 34. In one example, server 62 is a virtual appliance comprising a freeze-dried software stack, which includes the application and guest operating system. The freeze-dried software stack typically includes a single software image of software, configuration, best practices and processes. The single software image typically comprises required functions of base products already configured and optimized for specific hardware platforms and packaged for distribution and maintenance.

In the embodiment of FIG. 3, monitor module 36 and analysis module 38 run on guest operating system 56. As described hereinabove, monitor module 36 and analysis module 38 may be embodied as processes, services, or applications and may not be collocated with application 32. In the embodiment shown in the figure, monitor module 36 runs in service partition 58 and monitors multiple applications running in multiple guest operating systems managed by hypervisor 54. In one example, hypervisor 54 is Xen, and monitor module 36 runs in guest operating system 56 on host computer 24, realized as "domain 0," which may also be referred to as the service partition. When Xen is used, a first guest operating system, typically referred to as domain 0, is booted automatically when hypervisor 54 boots and is given special management privileges including direct access to the physical hardware. In alternative embodiments, monitor module 36 can run in hypervisor 54, or it can run in a separate guest operating system on host computer 24, rather than running in the first guest operating system, or domain 0.

Monitor module 36 and analysis module 38 are shown in FIG. 3 as running on guest operating system 56 for the purpose of clarity. However, it is understood that the modules can be distributed among multiple servers, or that server 62 may be realized not only as a plurality of virtual machines, as shown in the figure, but also as any combination of real and virtual machines.

Embodiment 3

In another embodiment of FIG. 3, monitor module 36 monitors the availability of resources 60 on virtual machine 58. Resources 60 may comprise memory, storage space, central processing unit (CPU) cycles, storage bandwidth, network bandwidth, or any other resource used by application 32 to process requests from clients 26. When analysis module 38 raises the alert as described hereinabove, it may correlate utilization of resources 60 with the performance change using any method known to a person who is ordinarily skilled in the art.

One method for correlating resource utilization with performance measurements is described in U.S. Patent Publication No. 2006/0293777, whose disclosure is incorporated herein by reference. The method includes automatically deriving thresholds for platform-level metrics such as CPU utilization, storage bandwidth utilization, and memory utilization. Correlation of resource utilization with performance measurements by analysis module 38 may provide an understanding of which of resources 60 has the most impact on the performance of application 32. In some applications resources may be automatically adjusted responsively to the changes in performance measurements.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for monitoring performance, comprising:
   communicating application traffic comprising requests and responses of a single computer application that is carried in inbound and outbound packet traffic via at least one socket over a data network, the at least one socket excluding packet traffic of other computer applications;
   monitoring receipt times and exit times of data packets and respective packet headers to identify corresponding request packets and response packets of the single computer application among packets of the inbound and outbound packet traffic transiting the at least one socket;

defining a performance indicator of the application traffic based on the receipt times and exit times of the corresponding request packets and response packets;

measuring a first instance of the performance indicator during a first monitoring interval;

measuring a second instance of the performance indicator during a second monitoring interval;

making a determination that a change between the first instance and the second instance exceeds a predetermined threshold; and responsively to the determination, issuing an alert.

2. The method according to claim 1, wherein the application runs on a virtual machine.

3. The method according to claim 1, wherein the performance indicator comprises an average request arrival rate that is derived from the request packets.

4. The method according to claim 1, wherein the performance indicator comprises an average queue time obtained by applying Little's law to a measurement of the request packets and response packets.

5. The method according to claim 1, wherein the performance indicator comprises a mean latency obtained from differences in time between sending a request in the packet traffic and receiving a response.

6. The method according to claim 5, wherein the performance indicator comprises a mean service time obtained as a difference between the mean latency and an average queue time obtained by applying Little's law to a measurement of the request packets and response packets.

7. The method that according to claim 1, wherein the performance indicator comprises a frequency distribution of at least one of a mean service time and a mean queue time of the request packets and response packets.

8. The method according to claim 1, wherein the steps of measuring a first instance and measuring a second instance are performed only when the application traffic exceeds a predetermined level.

9. The method according to claim 1, further comprising the step of adjusting a computer resource responsively to the determination.

10. The method according to claim 9, wherein adjusting the resource of the computer comprises automatically adjusting the resource of the computer.

11. The method according to claim 1, further comprising the steps of:

recording data of the request packets and response packets; and identifying packet trains of multipacket messages among the request packets and response packets of the single computer application, the packet trains comprising a plurality of entrained packets transmitted in succession, wherein recording data is performed for exactly one packet of respective packet trains and recording data is not performed for other packets thereof, and wherein measuring the first instance and measuring the second instance of the performance indicator are performed responsively to the step of recording data.

12. The method according to claim 11, wherein the performance indicator is an average interarrival rate of the requests and responses.

13. A computer software product for monitoring performance, comprising a non-transitory computer storage medium in which computer program instructions are stored, which instructions, when executed by a processor, cause the processor to monitor application traffic comprising requests and responses of a single computer application that is carried in inbound and outbound packet traffic via at least one socket, the at least one socket excluding packet traffic of other computer applications, the inbound and outbound packet traffic being communicated over a data network, to monitor receipt times and exit times of data packets and respective packet headers to identify corresponding request packets and response packets of the single computer application among packets of the inbound and outbound packet traffic transiting the at least one socket, to define a performance indicator of the application traffic based on the receipt times and exit times of the corresponding request packets and response packets, to measure a first instance of the performance indicator during a first monitoring interval, to measure a second instance of the performance indicator during a second monitoring interval, to make a determination that a change between the first instance and the second instance exceeds a predetermined threshold, and responsively to the determination, to issue an alert.

14. The computer software product according to claim 13, wherein the single computer application runs on a virtual machine.

15. The computer software product according to claim 13, wherein the instructions cause the processor to measure the first instance and to measure the second instance only when the first instance exceeds a predetermined level.

16. The computer software product according to claim 13, wherein the instructions cause the processor to adjust a computer resource responsively to the determination.

17. A data processing system for monitoring performance comprising:

a memory for storing programs and data objects; and a processor, which is coupled to access the memory and is operative to perform the steps of:

monitoring application traffic comprising requests and responses of a single computer application that is carried in inbound and outbound packet traffic transiting at least one socket over a data network, the at least one socket excluding packet traffic of other computer applications;

monitoring receipt times and exit times of data packets and respective packet headers to identify corresponding request packets and response packets of the single computer application among packets of the inbound and outbound packet traffic transiting the at least one socket;

defining a performance indicator of the application traffic based on the receipt times and exit times of the corresponding request packets and response packets;

measuring a first instance of the performance indicator during a first monitoring interval;

measuring a second instance of the performance indicator during a second monitoring interval;

making a determination that a change between the first instance and the second instance exceeds a predetermined threshold; and responsively to the determination, issuing an alert.

* * * * *